United States Patent Office 2,701,803
Patented Feb. 8, 1955

2,701,803

SYNTHETIC LUBRICANTS

Bernard A. Orkin, Philadelphia, Pa., assignor to Socony-Vacuum Oil Company, Incorporated, a corporation of New York No Drawing. Application October 20, 1948,
Serial No. 55,639

4 Claims. (Cl. 260—332.3)

This invention relates, broadly, to ester-type synthetic lubricants having a combination of desirable properties, namely, high viscosity indices, relatively low pour points, good stability, and increased resistance to hydrolysis, and it is more particularly concerned with certain silicate esters having the aforementioned combination of desirable properties.

The silicate esters contemplated herein are organic compounds having the formula, $R_nSi(TR')_{4-n}$, wherein R and R' are aliphatic, alicyclic, aryl, aralkyl, or heterocyclic radicals; T represents an oxygen or a sulfur atom; and $n$ is an integer varying between one and three.

The preparation of compounds having the general formula, $R_nSi(OR')_{4-n}$, has been described by Cusa and Kipping (J. Chem. Soc., 1933, 1040); by Grütner and Cauer [Ber., 51, 1283 (1918)]; by Kipping (J. Chem. Soc., 1927, 1228); and by Post and Hofrichter [J. Org. Chem., 5, 572 (1940)]. However, the products described in the literature have had very low viscosities. This destroys their utility as lubricants. A number of esters of silicic acid are known to display unusual stability toward heat and oxidation. Thus, tetracresyl silicate, which has been widely used as a heat transfer medium, can be heated to about 450° C. without perceptible decomposition. Such esters, however, possess disadvantageous properties in that they readily undergo hydrolysis in the presence of water at elevated temperatures. By reducing the number of alkoxy groups in the molecule, i. e., by creating one or more direct carbon-silicon linkages, and by increasing the total number of carbon atoms in the molecule, an ester is obtained which is much less miscible with water and, accordingly, is less prone to undergo hydrolysis in the presence of water, even at elevated temperatures. The compounds having the general formula, $R_nSi(SR')_{4-n}$, have never been described in the literature, in so far as is now known.

In accordance with the present invention, it has now been discovered that esters having the formula, $R_nSi(TR')_{4-n}$, wherein R, R', T, and $n$ are as defined hereinbefore and having between about 24 and about 40 carbon and heterocyclic atoms per molecule, possess a combination of all of the desirable properties mentioned hereinbefore. It has now been found that esters having the formula, $R_nSi(TR')_{4-n}$, can be prepared in good yields and in a simple and efficient manner.

Accordingly, it is a broad object of the present invention to provide new compositions of matter. Another object is to provide a new class of silicate esters. An important object is to provide silicate ester-type of synthetic lubricants having high viscosity indices, relatively low pour points, good stability, and increased resistance to hydrolysis. Other objects and advantages of the present invention will become obvious to those skilled in the art from the following detailed description.

Broadly stated, the present invention provides new synthetic lubricants having high viscosity indices, relatively low pour points, good stability, and increased resistance to hydrolysis, which comprise organic compounds having the general formula, $R_nSi(TR')_{4-n}$, wherein R and R' are aliphatic, alicyclic, aryl, aralkyl, or heterocyclic radicals; T is an oxygen or a sulfur atom; and $n$ is an integer varying between one and three; in which the total number of carbon atoms and heterocyclic atoms in each molecule varies between about 24 and about 40, and, preferably, between about 26 and about 38.

The esters of the present invention can be prepared readily by reacting a compound having the formula, $R_nSiX_{4-n}$, wherein R is an aliphatic, an alicyclic, an aryl, an aralkyl, or a heterocyclic radical; X is a halogen atom; and $n$ is an integer varying between one and three, with a compound having the formula, R'TH, wherein R' is an aliphatic, an alicyclic, an aryl, an aralkyl, or a heterocyclic radical, and T is an oxygen or a sulfur atom, in accordance with the following equation:

(1) $R_nSiX_{4-n} + (4-n)R'TH \rightarrow R_nSi(TR')_{4-n} + (4-n)HX$

The compounds having the formula $R_nSiX_{4-n}$ used to prepare the products of the present invention are prepared by the reaction between a silicon tetrahalide and a suitable Grignard reagent. The preparation is set forth in the following equation:

(2) $RMgX + SiX_4 \rightarrow RSiX_3 + MgX_2$
(3) $2RMgX + SiX_4 \rightarrow R_2SiX_2 + 2MgX_2$
(4) $3RMgX + SiX_4 \rightarrow R_3SiX + 3MgX_2$ wherein R is an aliphatic, an alicyclic, an aryl, an aralkyl, or a heterocyclic radical, and X is a halogen atom. These procedures have been amply described by Kipping, Murray, and Maltby (J. Chem. Soc., 1929, 1180), Hyde and De Long [J. Am. Chem. Soc., 63, 1194 (1941)], and Gilliam, Liebhafsky, and Winslow [J. Am. Chem. Soc., 63, 801 (1941)]. The pure reactant having the formula $R_nSiX_{4-n}$ is isolated and purified by conventional operations, such as fractional distillation or crystallization.

It is within the concept of this invention to utilize mixtures of this reactant, without purification, in preparing compounds of the type contemplated herein. Obviously, such compounds will not be pure, but they will be mixtures which, nevertheless, afford excellent synthetic lubricants.

The alcohol or phenol reactants characterized by the formula, R'TH, set forth hereinbefore, which are used to prepare the synthetic lubricants of the present invention are the monohydroxy aliphatic alcohols, alicyclic alcohols, phenols, aromatic alcohols, and heterocyclic alcohols. Non-limiting examples are propanol-1, butanol-1, 2-methyl propanol-1, pentanol-1, hexanol-1, 2-ethylhexanol-1, octanol-1, octanol-2, dodecanol-1, octadecanol-1, cyclohexanol, 2-methylcyclohexanol, 3-methylcyclohexanol, phenol, 2-methylphenol, 3-methylphenol, 4-methylphenol, benzyl alcohol, α-naphthol, β-naphthol, 2-hydroxy-5-methylthiophene, 3-hydroxy-5-phenyl thiophene, 2-hydroxypyridine, 3-hydroxypyridine, and 8-hydroxyquinoline. The preparation of these materials is set forth in the literature and many of them are available in commercial quantities. While it will be apparent that the alcohol or phenol reactants should be pure in order to obtain products of reasonable purity, it is within the scope of the present invention to use technical grade alcohols or phenols, mixtures containing alcohols or phenols, or mixtures of two or more alcohols and/or phenols. It will be readily understood that products made from such mixtures will not be pure compounds. However, they have been found to be excellent synthetic lubricants in accordance with the present invention.

The thiol reactants, characterized by the aforementioned formula, R'TH, utilizable herein include the alkanethiols and the cyclic thiols, i. e., cycloalkanethiols, aranethiols, and heterocyclic thiols. Propanethiol-1, butanethiol-1, 2-methylpropanethiol-1, pentanethiol-1, 2-methylbutanethiol-4, hexanethiol-1, octanethiol-1, 2-ethylhexanethiol-1, decanethiol-1, dodecanethiol-1, cyclopentanethiol, cyclohexanethiol, methylcyclohexanethiols, thiophenol, o-tolylthiol, m-tolylthiol, p-tolylthiol, benzylthiol, α-naphthylthiol, β-naphthylthiol, thienylthiol-2, thienylthiol-3, 2-ethylthienylthiol-3, and pyridylthiol-2, may be mentioned by way of non-limiting examples. The thiols may be prepared in many different ways, as is well known to those familiar with the art, and many are available in commercial quantities. In order to obtain reasonably pure synthetic lubricant products, the thiol reactant should be pure. However, as those skilled in the art will readily appreciate, the thiol reactant may be of technical grade, a mixture containing thiol reactants, or a mixture of two or more thiol reactants. Obviously, products made from such mixtures or impure reactants will not be pure compounds. Nevertheless, they have been found to be satisfactory synthetic lubricants, within the scope of the present invention.

An excess of the reactant having the formula, R'TH, over that required to react with all of the halogen atoms in the compound having the formula, $R_nSiX_{4-n}$, as indicated in Equation 1 set forth hereinbefore, must be used. Ordinarily, as many as four moles of the reactant having the formula, R'TH, for each halogen atom in the compound having the formula, $R_nSiX_{4-n}$ is used. In practice, the mole ratio of the reactant having the formula, R'TH, to the reactant having the formula, $R_nSiX_{4-n}$, may vary between about two to one and about twelve to one, respectively.

As set forth hereinbefore, the sum of the number of carbon and heterocyclic atoms in the compounds having the formula $R_nSi(TR')_{4-n}$, varies between about 24 and about 40 and, preferably, between about 26 and about 38. This requirement will be the only limiting factor as to the number of carbon and heterocyclic atoms in the reactant having the formula, R'TH. For example, if the reactant, $R_nSiX_{4-n}$, is trihexylchlorosilane, the reactant having the formula, R'TH, must contain no fewer than six, nor more than twenty-two carbon and heterocyclic atoms per molecule.

For practical reasons, it is preferable to carry out the reaction in a non-polar hydrocarbon solvent. Especially preferred are the aromatic hydrocarbon solvents such as, for example, benzene, toluene, and xylene. The amount of solvent to be used will vary between about 25 per cent and about 90 per cent by weight, based on the total weight of the reactants.

The temperature of the reaction is not too critical a factor. In general, the temperature will be the reflux temperature of the solvent used and, preferably, it varies between about 80° C. and about 140° C. The time of reaction will depend on the temperature employed. In practice, the reaction is complete after heating the reactants at the preferred temperatures for a period of time varying between about 2 hours and about 5 hours, after all reactants have been added.

The reactant having the formula, R'SH, is reacted with the reactant having the formula, $R_nSiX_{4-n}$, in the presence of a trialkylamine. The amine combines with the hydrogen halide evolved during the reaction to form an insoluble amine hydrohalide which is subsequently removed by conventional methods of separation, such as filtration or decantation. Amines utilizable for this purpose are the trialkyl amines having between one and three carbon atoms per alkyl radical. Non-limiting examples are triethylamine and tripropylamine. At least one mole of amine should be used for each halogen atom in the compound having the formula, $R_nSiX_{4-n}$. In practice, the ratio of amine reactant to the reactant having the formula, $R_nSiX_{4-n}$, may vary between about one to one and about twelve to one, respectively.

The desired reaction product is isolated by distilling off, under normal or reduced pressure, excess solvent, amine, reactant having the formula R'TH and any unreacted $R_nSiX_{4-n}$ reactant. The desired ester is recovered, in relatively pure form, as the residue from the distillation operation.

It will be apparent to those skilled in the art that the esters of the present invention may be prepared in ways other than that set forth hereinbefore. For example, a compound having the formula, $(R'T)_{4-n}SiX_n$, may be prepared by reacting a compound of the formula, R'TH, with a silicon tetrahalide and fractionating the resulting reaction mixture. This reactant, $$(R'T)_{4-n}SiX_n$$

is then reacted with the Grignard reagent to form the product having the formula, $R_nSi(TR')_{4-n}$, in accordance with the following equation:

(5)
$$(R'T)_{4-n}SiX_n + nRMgX \rightarrow R_nSi(TR')_{4-n} + nMgX_2$$

The conditions and techniques for preparing compounds having the formula, $(RT)_{4-n}SiX_n$, are set forth in a copending application, Serial Number 42,535, filed by Orkin on August 4, 1948. The techniques involved in preparing the Grignard reagent are well known to those skilled in the art. Accordingly, they will not be discussed in detail herein. The ester products prepared in this manner are isolated by procedures similar to those set forth hereinbefore.

The following specific examples are for the purpose of exemplifying the esters of the present invention. It is to be clearly understood, however, that the invention is not to be considered as limited to the specific reactants used, or to the operations and manipulations described in the examples. As will be apparent to those skilled in the art, other reactants, as set forth hereinbefore, may be used to prepare a wide variety of products in accordance with this invention.

EXAMPLE 1

*Trioctylphenoxysilane*

The Grignard reagent was prepared in the conventional manner from 81.5 grams of n-octyl bromide and 11.8 grams of magnesium in the presence of 170 cubic centimeters of absolute diethyl ether. To this reagent were added 22 grams of phenoxytrichlorosilane in 50 cubic centimeters of absolute diethyl ether, and the solution was refluxed for 2.5 hours. Then, the excess Grignard reagent was destroyed through the addition of ice water and dilute sulfuric acid. The ether layer was separated, and the aqueous layer was extracted with ether. The extracts were combined with the main portion of the ether solution. The combined ether solutions were then dried and distilled to remove the ether. The distillation was continued up to a pot temperature of about 250° C., under a pressure of five millimeters to remove all volatile materials. The residue, after filtering through clay, consisted of 22 grams of a clear liquid. Pertinent data are set forth in Table I.

EXAMPLE 2

*Diethyldi(octoxy)silane*

To a warm solution of 58 grams of diethyldichlorosilane in 200 cubic centimeters of xylene, there were added, dropwise, 104 grams of octanol-1. The solution was held at reflux temperature (about 135° C.) for about four hours and then topped at 250° C., under two millimeters pressure. The residue was filtered and it consisted of 113.5 grams of a clear, mobile fluid having the properties set forth in Table I.

EXAMPLE 3

*Phenyltri(dodecoxy)silane*

A mixture of 29 grams of phenyltrichlorosilane, 93 grams of dodecanol-1, and 80 grams of benzene were heated at reflux temperature (about 80° C.) until evolution of hydrogen chloride had ceased (about three hours). More volatile materials were distilled out at atmospheric temperature, and the excess dodecanol-1 was removed at 115° C., under a pressure of three millimeters. The residue, after filtration, was a clear, slightly viscous oil containing 4.55 per cent silicon ($C_{42}H_{80}O_3Si$ contains 4.25 per cent silicon) and weighing 70 grams. Pertinent properties are given in Table I.

EXAMPLE 4

*Benzyltri(octylthio)silane*

A solution of 13 grams of benzyltrichlorosilane and 43 grams of octanethiol-1 in 200 cubic centimeters of benzene was placed in a reaction vessel. To this solution was added, dropwise, 37 grams of triethylamine. After the addition was complete, the reaction mixture was heated at reflux temperature (about 80° C.) for four hours. The reaction mixture was then filtered and the triethylamine hydrochloride was washed with benzene. The filtrate was topped free of benzene and unreacted materials at about 130° C. under about 2 millimeters pressure. The residue was filtered through filtering clay. The product was a yellow, oily material having properties as set forth in Table I.

EXAMPLE 5

*Thienyltri(decylthio)silane*

To a solution of 21.8 grams of thienyltrichlorosilane and 69.6 grams of decanethiol-1 in 300 cubic centimeters of xylene, there were added 40 grams of triethylamine. The resultant reaction mixture was heated at the reflux temperature (about 135° C.) for about 2 hours. The reaction product was filtered to remove triethylamine hydrochloride and the filtrate was topped to remove the low-boiling materials. The resultant product, after filtering through filtering clay, consisted of 33.5 grams of an orange, mobile liquid. The pertinent physical properties are set forth in Table I.

EXAMPLE 6

*Diethyldi(decylthio)silane*

To 24 grams of diethyldichlorosilane and 58 grams of decanethiol-1 in 200 cubic centimeters of xylene were added gradually 67 grams of triethylamine. After the addition was complete, the mixture was refluxed at 135° C. for about 3 hours, then cooled and filtered. The filtrate was topped at 200° C. under about 15 millimeters pressure and the residue was filtered through filtering clay. The physical data for the light yellow, mobile liquid product are set forth in Table I.

TABLE I

| Example | Pour Point, °F. | Kinematic Viscosity, Centistokes | | Viscosity Index |
|---|---|---|---|---|
| | | at 100° F. | at 210° F. | |
| I | <-35 | 16.55 | 3.53 | 101 |
| II | <-65 | 3.58 | 1.43 | 141 |
| III | +10 | 20.43 | 4.97 | 176 |
| IV | <-60 | 17.01 | 3.85 | 139 |
| V | 0 | 7.90 | 2.50 | 158 |
| VI | +5 | 8.79 | 2.68 | 159 |

It will be apparent, from the data set forth in Table I, that the products having the formula, $R_nSi(TR')_{4-n}$, in which the total number of carbon atoms and heterocyclic atoms varies between about 24 and about 40, are excellent synthetic lubricants having high viscosity indices, relatively low pour points, and good stability. The criticalness of the minimum number of carbon and heterocyclic atoms is demonstrated by the data for the product of Example 2 having 20 atoms per molecule, wherein the viscosity is so low that the product has no utility as a lubricant. On the other hand, the product of Example 3, having 42 carbon atoms per molecule, has an undesirably high pour point.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:
1. Trioctylphenoxysilane.
2. Benzyltri(octylthio)silane.
3. Thienyltri(decylthio)silane.
4. A compound having the formula $R_nSi(TR')_{4-n}$, wherein R and R' are radicals selected from the group consisting of alkyl, thienyl and benzyl radicals, T is a divalent atom selected from the group consisting of oxygen and sulfur atoms, and $n$ is an integer varying between one and three, in which the total number of carbon atoms plus heterocyclic atoms in each molecule varies between 26 atoms and 38 atoms, there being not more than 3 heterocyclic atoms per molecule, and in which at least one of said radicals R and R' is an alkyl radical; said compound being a lubricant having a relatively low pour point, a high viscosity index, a viscosity in the lubricating oil range, and resistance to hydrolysis.

References Cited in the file of this patent

UNITED STATES PATENTS

| | | |
|---|---|---|
| 2,129,281 | Lincoln | Sept. 6, 1938 |
| 2,386,452 | Fleming | Oct. 9, 1945 |
| 2,386,793 | Hanford | Oct. 16, 1945 |
| 2,397,727 | Daudt | Apr. 2, 1946 |
| 2,439,689 | Hyde | Apr. 13, 1948 |
| 2,462,267 | Hyde | Feb. 22, 1949 |
| 2,527,233 | Sowa | Oct. 24, 1950 |
| 2,562,474 | Orkin et al. | July 31, 1951 |

OTHER REFERENCES

Chemical Abstracts 35, 2470, item 3 (1941).
Cusa, J. Chem. Soc. 136, 1040-3 (1933).
Whitmore, Organic Chemistry, p. 884, Van Nostrand, N. Y., 1937.